United States Patent [19]

Turchan

[11] Patent Number: 5,264,195
[45] Date of Patent: Nov. 23, 1993

[54] METHOD OF REDUCING OXIDES OF NITROGEN USING ALKANOLAMINE COMPOUNDS

[76] Inventor: Otto C. Turchan, 458 El Camino Dr., Beverly Hills, Calif. 90212

[21] Appl. No.: 828,475

[22] Filed: Jan. 30, 1992

[51] Int. Cl.$^5$ .......................... C01B 21/00; C01C 3/00
[52] U.S. Cl. ...................................... 423/235; 423/246
[58] Field of Search ................. 423/235, 246, 235 D

[56] References Cited

U.S. PATENT DOCUMENTS

| | | | |
|---|---|---|---|
| 4,071,602 | 1/1978 | Pearce | 423/235 |
| 4,803,059 | 2/1989 | Sullivan | 423/235 |
| 4,943,421 | 7/1990 | Turchan | 423/235 |

FOREIGN PATENT DOCUMENTS

| | | | |
|---|---|---|---|
| 3730141 | 3/1989 | Fed. Rep. of Germany | 423/246 |
| 54-38268 | 3/1979 | Japan | 423/235 |

*Primary Examiner*—Gregory A. Heller

[57] ABSTRACT

The subject invention relates to a method for combined reduction of the concentrations of nitrogen oxides (NOx) and carbon monoxide (CO) formed in fossil fuels combustion process in combustion apparatus and fuels combustion devices, such as automotive and stationary internal combustion engines, gas turbines, fuel fired power boilers and heaters, among others, by the reduction process conversion of NO to harmless $N_2$ and water, combined with oxidation of CO to carbon dipoxide ($CO_2$), which is subsequently discharged in the effluent combustion products gasea into the ambient air atmosphere. The combined process of NOx reduction and CO oxidation comprising the step of interjecting ethylenediamine and/or alkanolamine compounds into the fuel combustion reaction products gases mixture of a fossil fuel fired combustion apparatus or combustion device, wherein the intermixed NO and CO with the interjected ethylenediamine and/or alkanolamine compounds undergo the reduction process of converting NO to the harmless $N_2$ and $H_2O$, and oxidation process of converting CO to $CO_2$, which is subsequently discharged in the fuels combustion products gas effluents into the ambient air atmosphere.

1 Claim, No Drawings

METHOD OF REDUCING OXIDES OF NITROGEN USING ALKANOLAMINE COMPOUNDS

BACKGROUND OF THE INVENTION

My invention pertains to a method for the combined reduction of the concentrations of carbon monoxide (CO) and oxides of nitrogen (NOx) formed in fossil fuels combustion and combustion effluents. My invention relates, to the admixture of alkanolamines and/or ethylenediamine compounds to fossil fuels combustion product gases, for the combined oxidation of carbon monoxide and reduction of nitrogen oxides produced in combustion of fossil fuels and fossil fuels derivatives, such as natural gas, synthetic coal gas, gasolines and fuel oils, used in internal combustion engines, diesel engines, gas turbines, process furnaces, porker plant boilers, as well as coal used in firing various other combustion equipment. My invention further relates to the injection of alkanolamines and/or ethylenediamine chemical compound solutions into the fossil fuels combustion reaction gas products, for the combined reduction of the carbon monoxide and the nitrogen oxides concentrations produced in the combustion of the fossil fuels, which would otherwise be ordinarily discharged in the combustion effluents from fossil fuels fired combustion apparatus and devices such as, including but not limited to, gas turbines, power plant boilers, process furnaces, fired heaters, steam boilers.

Fossil fuels combustion waste products discharged from various combustion sources into the ambient atmosphere, contain carbon monoxide and nitrogen oxides, which are the major cause of harmful air pollution resulting in serious smog problems. The major health irritants are carbon monoxide (CO) and the nitrogen oxides (NOx), all of these being extremely poisonous gases present a serious air pollution problem. Major portion of the CO and NOx gases discharged into the atmosphere comes from fossil fuels combustion in automotive internal combustion engines; but stationary sources of CO and NOx discharge, such as power plants, fired boilers and process furnaces, incinerators and similiar combustion equipment, are also very significant contributors. In these combustion processes thermal NOx is formed as nitric oxide (NO) in the high temperature combustion zone from the nitrogen and oxygen in the combustion air and of the combustion gases. The high temperatures in the combustion zone favour NO formation, the original form in which the oxides of nitrogen are created in the combustion process. This NO is subsequently oxidized to $NO_2$, as soon as the lower temperatures required for this are reached upon discharge into the ambient air. The CO contained in the fossil fuels combustion products gases results from the incomplete combustion of the carbon content in the combustion fuels.

In prior art there have been considerable and numerous efforts to find separate and distinctive methods: one method of removing NO and $NO_2$ from combustion effluents by reduction with the injection of ammonia into the combustion effluents as the reducing agent, both with and without the aid of a catalyst; another separate and distinct method of removing CO from the combustion products gases by means of noble metals catalysts to produce the oxidation of CO into $CO_2$ conversion. The one separate and distinct prior art relates to NOx reduction methods constrained to NO reduction in the combustion gases effluent flow downstream of the region of fuel combustion where the effluent gases have cooled down to the lower temperature range required by the catalyst to promote an effective catalytic reaction between the NO and the injected ammonia passing over the SCR-type catalyst, which is effective only within a narrow range of low temperature combustion products gas effluents. Other recent separate and distinct prior art relates to methods of reducing nitrogen oxides contained in the combustion products gases by injection of urea, or hydrazine compounds, or amine compounds into the combustion products gases effluents. Another seperate and distinct prior art relates to one method of reducing the CO contained in the combustion product gases by the process of catalytic combustion (i.e. oxidation) of CO to $CO_2$, wherein the combustion products gases containing CO and $O_2$ pass over a noble metals catalyst at relatively high gas temperatures in order to sustain the catalytic combustion process.

Consequently, the prior art relates to the reduction of NOx and oxidation of CO in the fuels combustion products gaseous effluents by two saperate and distinct methods, where according to prior art both of the two saperate and distinct methods have to be employed in conjuction with each other, in order to obtain the combined reduction of nitrogen oxides and oxidation of carbon monoxide contained in the fuel combustion products gases.

SUMMARY OF THE INVENTION

Accordingly I claim the object of my invention a method for the combined reduction of nitrogen oxides and oxidation of carbon monoxide formed in fossil fuels combustion by the use of ethylenediamine and/or alkanolamine compounds to be interjected into the fossil fuels products of combustion as the chemical compounds agents for the combined reduction of nitrogen oxides and oxidation of carbon monoxide formed in the combustion process, prior to the discharge of the combustion products effluents into the atmosphere.

The combustion process efficiency depends on favourable conditions within the combustion chamber, such as excess of combustion air, air to fuel ratio, effective mixing of the fuel with combustion air, optimal flow in combustion zone for flame stability and proper choice of the air to fuel ratio for a given fuel combustion process. Main causes of incomplete fuel combustion, with the consequent CO generation, under correct burning conditions and sufficient air surplus, can be a low reaction temperature or inadequate retention time of the reacting substances in the combustion reaction zone. Higher flame temperatures and longer retention times of reacting substances in the main combustion reaction zone improve the combustion process, however, result in increased NO formation in the combustion reaction zone. With some simplifications, the mechanism of NOx formation within the fuel combustion reaction process, can be represented by the reaction between the nitrogen and oxygen contained within the high temperature combustion air, forming nitrogen oxides as follows

$N_2 + O_2$..........Nitrogen oxides.

Depending on combustion flame temperature and retention time, this reaction reaches sooner or later a condition of equilibrium, where as much NO is being dissociated to molecular $N_2 + O_2$ as is being formed anew, so that the NO content does not rise measurably any more.

The speed with which this equilibrium is reached is first of all dependent on the combustion zone temperature and on the local air to fuel ratio. The NO content at this equilibrium is largely determined by the same two parameters as well.

The object of my invention is a method interjecting ethylenediamine and/or alkanolamine compounds into the combustion products gas effluents of the fossil fuels combustion process, as the chemical agents to substantially remove the remaining CO by oxidation to $CO_2$ and NO by reduction to molecular $N_2$ and $H_2O$, in reaction with the chemical agents mixture of the interjected amines compound contacted by the CO and NO contained in the combustion products of the fuel combustion process. The further object of my invention is a method using ethylenediamine and/or alkanolamine compounds solutions admixtures in the fossil fuels combustion to act as the chemical agents for the combined removal of the remaining CO and NOx in the fossil fuels combustion products gases, which was generated in the combustion reaction process, by converting the NOx to $N_2$ and $H_2O$, and CO to $CO_2$, which are then discharged to the ambient air in the combustion gas effluents.

The ethylenediamine and alkanolamine compounds of monoethanolamine, diethanolamine, monoisopropanolamine and/or diisopropanolamine have been shown to be powerful reducing agent in the combustion reaction process with a variety of oxides of nitrogen used as oxidizer in rocket bipropellant combinations. These amities compounds when employed as rocket fuel propellents are used in combination with a variety of oxides of nitrogen as oxidizers, such as NO, $NO_2$, $N_2O_4$, mixed oxides of nitrogen, RFNA(NO 6.5 to 22%) and WFNA, where these bipropellant combinations are hypergolic (i.e. the fuel and oxidizer burn spontaneously upon contact). The hypergolic property of these bipropellent combinations is characteristic of the disposition of strong chemical reaction affinity between the fuel and oxidizer in the rapid oxidation-reduction process accompanied by the release of large amount of energy at a correspondingly large reaction rate. The consideration of the well proven and powerful properties of the above cited amines compounds for the reduction of the various oxides of nitrogen, established the chemical basis for selecting these amine compounds solutions for injection into the fossil fuels combustion products gases, to act as the reducing agent for the reduction of nitrogen oxides contained in the products of combustion formed in the fossil fuels combustion process. Furthermore, it has been also shown that the injection of ethylenediamine and/or monoethanolamine, diethanolamine, monoisopropanolamine and/or diisopropanolamine into the fossil fuels combustion products gases containing NO, CO and $O_2$ from the excess combustion air, these amine compounds promote the oxidation reaction of CO to $CO_2$.

DETAILED DESCRIPTION OF THE INVENTION

The subject of my invention relates to a method for the combined removal the CO and NO contained in the combustion reaction gasses as products of the fossil fuels combustion process, said method comprising the step of injecting sufficient amount of ethylenediamine and/or alkanolamine compounds solution into the fossil fuels combustion reaction products as reducing agents for NO, and oxidation agents for CO, to remove both, the CO and NOx contents present in the combustion gases by the reduction reaction of NOx to $N_2$ and $H_2O$, and the oxidation of CO to $CO_2$, in reaction with the interjected admixture of amines compounds.

In practice of this invention, in order to obtain effective silmutaneous removal of CO and NO contained in the fossil fuels combustion products, it is important that the injected admixture of amities compounds solution used with the fossil fuels are thoroughly intermixed and dispersed into the combustion gases produced by the fossil fuels combustion reaction, to facilitate contact between the carbon monoxide, the oxides of nitrogen and the interjected admixture of amines compounds.

The amount and rate at which ethylenediamine and/or alkanolamine compounds are to be interjected into the fossil fuels combustion reaction products for the combined reduction of NO and oxidation of CO, both of which are formed in the fossil fuels combustion reaction process, is primarily dependent on the rate and amount of NO and CO generated in the combustion process, which in turn depends on the rate of fuel consumption and type of fossil fuel used in the combustion process, as well as the type and design of the fossil fuels fired combustion apparatus or device. Fundamentally, under ideal process conditions, the reduction reaction of 1 mole NO and oxidation reaction of about 1 mole of CO, with ½ mole ethylenediamine $NH_2CH_2CH_2NH_2$ produces 1 mole each $N_2$ and $H_2O$ and converts about 1 mole of CO to $CO_2$. Consequently, if the combined NO reduction reaction and CO oxidation reaction was carried out under ideal process conditions, the amount and rate of ethylenediamine compound to be interjected into the combustion gases of fossil fuels combustion reaction, would require at least about the minimum of 0.5 mole ethylenediamine, or at least about the minimum of 1.0 mole of monoethanolamine, per 1 mole of NO and 1 mole of CO that is formed in the fuel combustion process. However, the perfect mixture conditions required in the ideal process, in which the total amount of NO and CO contained in the mixture of combustion gases comes into contact with the total amount of the interjected amines compounds in the same mixture at any given time, can not be realistically achieved, allowing a fraction of the NO to escape the reduction reaction and a fraction of the CO to escape the oxidation conversion to $CO_2$. Therefore, in order to assure that substantially most of the NO and CO formed in the fuel combustion process is converted to $CO_2$, $N_2$ and $H_2O$, substantially larger amounts than the ideal minimum amount of the respective amities compounds is interjected into the fuel combustion reaction gases, until reduction of substantially most of all NO and CO conversion contained in the combustion products gases is accomplished.

The ethylenediamine and/or alkanolamine compounds combined reduction reaction of NOx and oxidation reaction of the CO contained in the fossil fuels combustion reaction gases, is carried out at the operating combustion pressures of the respesctive types of combustion devices, for combustion presures ranging from about 0.5 atmospheres to 100 atmospheres.

For example in a typical gas turbine combustion process the combustion of 1 kg of natural gas fuel produces about 20 g NO and about 10 g CO, which are discharged in the gas turbine combustion effluents. These amounts represent approximately 0.67 moles of NO and approximately 0.4 moles of CO per kg of natural gas fuel combustion. Using the interjection ratio of 1 mole of ethylenediamine per 1 mole of NO formed in the fuel combustion, as the amount of ethylenediamine being interjected into the gas turbine combustion reaction gases in the gas turbine combustors, result in about an 85% reduction of the NO and CO concentration in the combustion products effluent gases content.

In an embodiment of my invention for stationary gas turbines operating on the combustion of fuel oil, natural gas, fossil fuels and fuel derivatives. the amount of ethylenediamine and/or alkanolamines compounds needed for the reduction of the NO amd CO formed in the gas turbine combustion reaction gases in the process of the fuels combustion, is injected in water solution as admixture to the gas turbine combustion fuel, or by means of steam, or air injection into the gas turbine combustors containing the fuel combustion reaction gases.

In another embodiment of my invention for stationary internal combustion engines, automotive internal combustion engines, power plant boilers as well as other fossil fuel fired combustion devices operating on combustion of fossil fuels and/or fossil fuels derivatives, the amount of the ethylenediamine and/or compounds needed for the reduction of the NO and CO formed in the fuels combustion, is interjected into the combustion reaction products gases by means of steam or air injection of the ethylenediamine and/or alkanolamine compounds solutions.

In yet another embodiment of my invention for fossil fuels fired combustion apparatus operating on the combustion of solid fuels, gaseous fuels as well as liquid fuels, the amount of amines compounds needed for the reduction of the given amount of NO and CO formed in the fuel combustion process, are interjected into the fuel combustion reaction products gases, by steam, water or air, where the injected admixture propells and mixes the amities compounds with the combustion fuel, combustion air and combustion product gases containing the NO and CO, which reacts with the interjected amines compounds to convert the NO to harmless molecular nitrogen $N_2$ and water, and converts the CO by oxidation to $CO_2$.

Thus the reader will see that the single method for the combined reduction of nitrogen oxides and oxidation of carbon monoxide contained in the fossil fuels type combustion reaction products gases, of the invention above, is far superior to and far more cost effective to implement, replacing the complex need for employing two separate and distinct prior art methods, one related to the reduction of nitrogen oxides and another for the oxidation of carbon monoxide, which has proven to be not only always very difficult, but also incompatible in many instances.

While the above description contains many specificities, the reader should not construe these as limitations on the scope of the invention, but merely as exemplifications of prefered embodiments thereof. For example skilled artisans will readily be able to change the proportions of the amounts of the ethylenediamine and/or alkanolamine compounds interjected into the fossil fuels combustion reaction produced gases, make adjustments in the amounts needed for the reduction of the total amount of NO and CO formed in the fuel combustion process which is strongly influenced and dependent on a given fossil fueled combustion apparatus type and design, as well as the type of fuel used. They can make many variations in the method of interjecting the ethylenediamine and/or alkanolamine compounds into the fuels combustion reaction produced gases. In fact they can redesign and make physical changes in combustion devices wherein the ethylenediamine and/or alkanolamine compounds could be interjected into the combustion process by admixture to the combustion fuels and/or combustion air mixtures.

My invention is then a process for the combined reduction of nitrogen oxides and oxidation of carbon monoxide, produced in fossil fuels combustion reactions of combustion reactants and retained in the combustion reactions gas products of a fossil fuels combustion apparatus or combustion device, the said combined reduction of nitrogen oxides and oxidation of carbon monoxide process comprising: the step of interjecting an admixture o chemical compounds agents for the combined reduction of nitrogen oxides and oxidation of carbon monoxide into said fossil fuels combustion reactions gas products and combustion reactants, said admixture of chemical compounds agents for the combined reduction of nitrogen oxides and oxidation agents for the combined reduction of nitrogen oxides and oxidation of carbon monoxide comprising of ethylenediamine, monoethanolamine, diethanolamine, momoisopropanolamine, diisopropanolamine compounds in any combination or individually interjected, either directly, or in any combination, with combustion fuel, water or combustion air, into said combustion reactions gas products containing nitrogen oxides and carbon monoxide produced in the fossil fuels combustion process, wherein said interjected chemical compounds agents for combined reduction of nitrogen oxides and oxidation of carbon monoxide intermix with said combustion reaction gas products including said nitrogen oxides and carbon monoxide, whereby the intermixed nitrogen oxides, carbon monoxide and the interjected chemical compounds agents for combined reduction of nitrogen oxides and oxidation of carbon monoxide in the combustion reaction gas products, react in chemical reduction process of converting said nitrogen oxides to harmless molecular nitrogen and water, and oxidation process of said carbon monoxide to carbon dioxide, which are subsequently discharged in the effluent of combustion products gases to the ambient atmosphere. Accordingly the reader is requested to determine the scope of my invention by the appended claims and their legal equivalents and not by the examples which have been given.

What I claim is:

1. A process for the combined selective reduction of nitrogen oxides and oxidation of carbon monoxide contained in combustion reaction gases generated by fossil fuels or fossil fuels derivatives combustion reaction in a combustion apparatus or combustion devices, said process comprising:

the step of contacting said nitrogen oxides and carbon monoxide contained in said combustion reaction gases in the presence of oxygen with a reducing agent comprising monoethanolamine, diethanolamine, monisopropanolamine or diisopropanolamine, and their aqueous solutions, individually or in any combination, and wherein said reducing agent or said reducing agent's aqueous solutions are admixed into said fuels, said reducing agent being present in an amount sufficient to provide an equivalent mole ratio of said reducing agent ranging from about at least 0.5 mole per mole of NO contained in said combustion reaction gases, and wherein said reducing agent react with said nitrogen oxides and carbon monoxide containing combustion reaction gases, whereby said nitrogen oxides are selectively reduced by conversion to molecular $N_2$ and $H_2O$ and said carbon monoxide converted by oxidation to $CO_2$ in reaction with said reducing agent in the presence of oxygen.

* * * * *